(12) United States Patent
Jordan et al.

(10) Patent No.: US 12,543,879 B2
(45) Date of Patent: Feb. 10, 2026

(54) CONTAINER FOR UNSUPERVISED DELIVERIES

(71) Applicant: Quality Time Savers, Inc., Mt. Gilead, NC (US)

(72) Inventors: Robert B Jordan, Mt. Gilead, NC (US); Eddie Alexander Meeks, Greensboro, NC (US)

(73) Assignee: Quality Time Savers, Inc., Greensboro, NC (US)

( * ) Notice: Subject to any disclaimer, the term of this patent is extended or adjusted under 35 U.S.C. 154(b) by 307 days.

(21) Appl. No.: 17/833,036

(22) Filed: Jun. 6, 2022

(65) Prior Publication Data

US 2022/0400886 A1    Dec. 22, 2022

Related U.S. Application Data

(60) Provisional application No. 63/209,556, filed on Jun. 11, 2021.

(51) Int. Cl.
| | |
|---|---|
| *A47G 29/14* | (2006.01) |
| *A47G 29/12* | (2006.01) |
| *A47G 29/30* | (2006.01) |

(52) U.S. Cl.
CPC ....... *A47G 29/141* (2013.01); *A47G 29/1201* (2013.01); *A47G 29/30* (2013.01); *A47G 2029/143* (2013.01); *A47G 2029/147* (2013.01)

(58) Field of Classification Search
CPC ...... A47G 29/141; A47G 29/30; A47G 29/12; A47G 29/28; A47G 29/12095; A47G 29/1201; A47G 2029/143; A47G 2029/144; A47G 2029/147; A47G 2029/1257; G07F 17/13
See application file for complete search history.

(56) References Cited

U.S. PATENT DOCUMENTS

| | | | | |
|---|---|---|---|---|
| 1,060,018 | A | * | 4/1913 | Pape ........................ E05G 1/08 70/85 |
| 1,817,191 | A | * | 8/1931 | Harmony ........... A47G 29/1201 232/24 |
| 4,557,416 | A | * | 12/1985 | Stahl .................. A47G 29/1201 232/24 |
| 4,648,550 | A | * | 3/1987 | Cleary, Jr. .......... A47G 29/1201 232/43.4 |
| 4,894,717 | A | * | 1/1990 | Komei ...................... G07F 7/00 348/E7.087 |
| 5,774,053 | A | * | 6/1998 | Porter .................. A47G 29/141 340/568.1 |

(Continued)

FOREIGN PATENT DOCUMENTS

| | | | | |
|---|---|---|---|---|
| CN | 213876933 | U | * 8/2021 | |
| FR | 2830524 | A1 | * 4/2003 | ........... A47G 29/141 |

(Continued)

*Primary Examiner* — William L Miller
(74) *Attorney, Agent, or Firm* — MacCord Mason PLLC

(57) ABSTRACT

Delivery reception system, assemblies, and devices are shown and described. In one embodiment, a universal delivery reception unit includes a chassis frame, a first insert module secured within the chassis frame, and at least a second insert module adjacent the first insert module and secured within the chassis frame. The result is a universal delivery reception unit for temporarily receiving and storing independent deliveries at a site.

40 Claims, 22 Drawing Sheets

(56) References Cited

U.S. PATENT DOCUMENTS

| | | | |
|---|---|---|---|
| 6,003,761 A * | 12/1999 | Chapman | A47G 29/1201 232/27 |
| 9,658,912 B2 | 5/2017 | Gao | |
| 9,745,130 B1 * | 8/2017 | Rawal | G06Q 10/0875 |
| 9,934,483 B1 * | 4/2018 | Sangani | G06Q 10/0837 |
| 10,039,380 B2 * | 8/2018 | Pitts | G07F 17/12 |
| 10,053,288 B1 * | 8/2018 | Rawal | G06Q 10/0836 |
| 11,690,924 B1 * | 7/2023 | Gokcebay | A61L 2/26 250/455.11 |
| 11,797,914 B2 * | 10/2023 | Yamamoto | G06Q 10/0834 |
| 12,086,756 B2 * | 9/2024 | Irwin | G06Q 10/0836 |
| 2002/0167404 A1 | 11/2002 | Jordan, IV | |
| 2013/0261792 A1 * | 10/2013 | Gupta | G05B 15/02 700/232 |
| 2013/0264381 A1 * | 10/2013 | Kim | G07F 17/13 232/24 |
| 2016/0066732 A1 * | 3/2016 | Sarvestani | A47G 29/141 232/24 |
| 2016/0286998 A1 * | 10/2016 | Lindbo | F25D 29/00 |
| 2017/0215620 A1 * | 8/2017 | Dade | F25D 17/00 |
| 2017/0286905 A1 * | 10/2017 | Richardson | G06Q 10/0836 |
| 2018/0070753 A1 * | 3/2018 | Eveloff | H04W 4/025 |
| 2019/0313828 A1 * | 10/2019 | Schmider | E05G 1/024 |
| 2019/0370744 A1 * | 12/2019 | Fee | G07C 9/38 |
| 2020/0012245 A1 * | 1/2020 | Marin Pulido | G06Q 10/0836 |
| 2020/0293990 A1 * | 9/2020 | Mak | G06K 7/10366 |
| 2020/0349796 A1 * | 11/2020 | Gokcebay | G07C 9/00896 |
| 2021/0000275 A1 * | 1/2021 | Excoffier | G07G 1/0063 |
| 2021/0287466 A1 * | 9/2021 | Estill | G06Q 10/0836 |
| 2021/0293465 A1 * | 9/2021 | Cartwright | G06Q 10/0832 |
| 2021/0370988 A1 * | 12/2021 | Cheng | E05G 1/026 |
| 2022/0028192 A1 * | 1/2022 | O'Rourke | G07C 9/00182 |
| 2022/0170989 A1 * | 6/2022 | Froissart | G07C 9/00309 |
| 2022/0361699 A1 * | 11/2022 | Lee | A47G 29/30 |
| 2023/0115325 A1 * | 4/2023 | Thorp | G07F 9/105 340/5.73 |
| 2023/0177904 A1 * | 6/2023 | Galano | G06Q 50/12 340/5.73 |
| 2023/0275349 A1 * | 8/2023 | Hiramatsu | H01Q 5/35 343/702 |
| 2024/0065465 A1 * | 2/2024 | Vardaro | A47G 29/141 |
| 2024/0144753 A1 * | 5/2024 | O'Rourke | A61L 2/26 |
| 2024/0188731 A1 * | 6/2024 | Hagstrom | A47F 3/0408 |
| 2025/0252806 A1 * | 8/2025 | Pointeau | G07F 17/13 |

FOREIGN PATENT DOCUMENTS

| | | | |
|---|---|---|---|
| JP | H0651193 U | * | 7/1994 |
| JP | H0651194 U | * | 7/1994 |
| JP | 3182955 U | * | 4/2013 |

* cited by examiner

CONTAINER FOR UNSUPERVISED DELIVERIES

This application claims the benefit of U.S. provisional application No. 63/209,556, filed Jun. 11, 2021, which is incorporated herein by reference in its entirety.

FIELD OF THE TECHNOLOGY

The present disclosure relates generally to deliveries, and more particularly to improved delivery reception units and structures.

SUMMARY

In accordance with the present disclosure, tower systems and assemblies are provided for a wide variety of delivery applications. This disclosure provides improved assemblies and devices that are convenient, efficient, and safe for delivery reception, for instance in an unsupervised delivery platform and the like.

In one embodiment a universal delivery reception unit includes a frame having a first, second, third and fourth sides, the first and second sides opposing one another and the third and fourth sides opposing one another; a first insert module secured within the frame and having a proximate electronic delivery access face and an independent, opposing distal electronic receiving access face; and at least a second insert module adjacent the first insert module and secured within the frame, and wherein the second insert module having a proximate electronic delivery access face and an independent, opposing distal electronic receiving access face.

In certain examples, the universal delivery reception unit being a stand-alone unit positioned proximate to a household for temporarily storing items delivered to the household. The frame may include a plurality of spatially separated vertical frame supports. The frame may include at least one intermediate vertical frame support. The frame may include a plurality of lateral supports. The frame may include a plurality of cross supports. The cross supports may include a first rail and an opposing, coplanar second rail. The first rail and the second rail may include a guide rail retention flange. The first rail and the second rail may include at least one roller wheel. The first rail and the second rail may include a ramp adapted for self-seating the insert modules. The first rail and the second rail may include a guideway adapted to lock an edge of the insert module in a fixed position.

In certain examples, the frame may include a foundation assembly. The foundation assembly may include a plurality of footings. The plurality of footings may be independently adjustable. The insert module may include a dry cleaning box. The insert module may include a small package box. The insert module may include at least a partial cold storage box. The insert module may include at least a partially incubated box. The insert module may include a dry goods box. The insert module may include an electronics housing box. The apparatus may include a front trim panel substantially enclosing surfaces adjacent the insert modules. The apparatus may include a rear trim panel substantially enclosing surfaces adjacent the insert modules. The proximate electronic delivery access faces may include a scan pad adapted to electronically communicate with an external signal. The proximate electronic delivery access faces may include an electronic piston shock.

In certain examples, the apparatus may include a shocking mounting pivot bracket. The apparatus may include a door cavity adapted to receive the electronic piston shock in a closed position. The proximate electronic delivery access faces may include at least one hinge. The apparatus proximate electronic delivery access faces may include a handle. The proximate electronic delivery access faces may include a manual backup. The manual backup may include a number pad. The proximate electronic delivery access faces may include a momentary switch. The momentary switch may include a push button adapted to activate an electronic piston shock. The proximate electronic delivery access faces may include a sensor. The sensor may include a door-ajar sensor adapted to notify an open door status.

In certain examples, the distal electronic access faces may include a scan pad adapted to electronically communicate with an external signal. The distal electronic access faces may include an electronic piston shock. The apparatus may include shocking mounting pivot bracket. The apparatus may include a door cavity adapted to receive the electronic piston shock in a closed position. The distal electronic access faces may include at least one hinge. The distal electronic access faces may include a handle. The distal electronic access faces may include a manual backup. The manual backup may include a number pad. The distal electronic access faces may include a momentary switch. The momentary switch may include a push button adapted to activate an electronic piston shock. The distal electronic access faces may include a sensor. The sensor may include a door-ajar sensor adapted to notify an open door status.

In certain examples, the electronics housing box may include a battery module. The electronics housing box may include a positive power indicator and a negative power indicator. The battery module may include a standby battery power module terminal strip. The electronics housing box may include at least one fastener. The electronics housing box may include a central processing unit (CPU) module in electronic communication with the insert modules. The apparatus may include a housing tab adapted to mate with a corresponding CPU module tab. The apparatus may include a terminal strip. The electronics housing box may include a cover plate. The apparatus may include at least one cover plate securement tab. The apparatus may include a plurality of fastener points. The apparatus may include a plurality of cold storage refrigerant components. The apparatus may include a freezer section. The apparatus may include a refrigerated section.

In one embodiment, a universal assembly for delivery reception includes an upper tier having a pair of spatially separated horizontal rails and at least one horizontal interconnect module pulled-through the upper tier in a mated position and secured on the horizontal rails, wherein the horizontal interconnect module comprising a pair of opposing electronic piston shocks; and a lower tier adjacent to the upper tier and having a pair of spatially separated horizontal rails and at least one horizontal interconnect module pulled-through the lower tier in a mated position and secured on the horizontal rails, wherein the horizontal interconnect module comprising a pair of opposing electronic piston shocks.

In certain examples, the interconnect modules may include a secure interior space. The interior space may include a pair of opposing doors in communication with the electronic piston shocks. The interior space may include a camera. The interior space may include an interior dome light. The interior space may include a sanitizer. The sanitizer may include an ultraviolet sanitizing light. The interconnect modules may include a pair of offset upper edges.

The offset upper edges may be recessed from an upper surface. The assembly may include a camera housing adapted to support an interior camera. The assembly may include a dome light housing adapted to support an interior dome light. The assembly may include a sanitizer housing adapted to support an interior sanitizer.

In certain examples, the interconnect modules may include a railway foot aligned along at least one bottom length adapted to engage a corresponding frame element. The interconnect modules may include a recessed side surface. The interconnect modules may include a mounting plate. The mounting plate may include a plurality of fastener apertures. The interconnect modules may include a door outside skin. The assembly may be a stand-alone unit positioned proximate to a building for temporarily storing items delivered to the household. The horizontal rails may include a guide rail retention flange. The horizontal rails rail may include at least one roller wheel. The horizontal rails may include a ramp adapted for self-seating the interconnect modules. The first rail and the second rail may include a guideway adapted to lock an edge of the interconnect module in a fixed position. The assembly may include a foundation assembly adapted to secure the assembly about a surface. The foundation assembly may include a plurality of footings. The plurality of footings may be independently adjustable.

In certain examples, the interconnect module may include a clothing delivery storage. The interconnect module may include a small package storage. The interconnect module may include at least a partially refrigerated box. The interconnect module may include at least a partially incubated storage. The interconnect module may include a dry goods storage. The interconnect module may include an electronics housing box. The assembly may include a front trim panel. The assembly may include a rear trim panel. The assembly may include at least one proximate electronic delivery access door having a scan pad adapted to electronically communicate with an external signal. The proximate electronic delivery access door may include an electronic piston shock. The assembly may include a shocking mounting pivot bracket. The assembly may include a door cavity adapted to receive the electronic piston shock in a closed position.

In certain examples, the interconnect module may include at least one hinge. The interconnect module may include a handle. The interconnect module may include a manual backup. The manual backup may include a number pad. The interconnect module may include a momentary switch. The momentary switch may include a push button adapted to activate an electronic piston shock. The interconnect module may include a sensor. The sensor may include a door-ajar sensor adapted to notify an open door status. The electronics housing box may include a battery module. The electronics housing box may include a positive power indicator and a negative power indicator. The battery module may include a standby battery power module terminal strip. The electronics housing box may include at least one fastener. The electronics housing box may include a central processing unit (CPU) module in electronical communication with the interconnect modules. The assembly may include a housing tab adapted to mate with a corresponding CPU module tab. The assembly may include including a terminal strip. The electronics housing box may include a cover plate. The assembly may include at least one cover plate securement tab. The assembly may include a plurality of cold storage refrigerant components. The assembly may include a freezer section, refrigerated section, the like, and a combination thereof.

In one embodiment a universal delivery reception unit comprises a stand-alone chassis frame positioned proximate to a building; and a plurality of insert modules secured about the chassis, and having an electronic delivery door on a first side of the chassis and an electronic receiving door on a second side of the chassis, and wherein the delivery door and the receiving door are independent and define a substantially hollow body adapted for temporarily storing items delivered to the building.

In certain examples, the insert module may be a dry goods module, a clothing delivery module, a small package module, a cold storage module, an incubated module, an electronics housing, the like, and a combination thereof. The insert module may include a security lock assembly. The insert module may include an illumination assembly. The insert module may include a monitoring assembly. The insert module may include a sanitation assembly. The delivery door of a first insert module may include a first electronic communication. The delivery door of a second insert module may include a second electronic communication distinct of the first electronic communication. The receiving door of the first insert module and the second insert module may include a consistent electronic communication. The insert module may include at least one contactless locking door.

In one embodiment, a delivery reception assembly comprises a chassis defining a plurality of openings; and a plurality of separable, individually automated insert modules housed within the openings, and wherein the insert modules having a delivery access and a receiving access independent of the delivery access, and adapted for temporarily storing items delivered to a household.

In certain examples, the plurality of openings have a first cross rail and an opposing co-planar second cross rail.

In one embodiment, a universal delivery reception assembly comprises a chassis having a vertical support rails, an intermediate vertical support rail, and a lateral support rail; a dry box insert module secured about the chassis and having a substantially hollow body adapted to allow predetermined personnel access; a cold storage insert module secured about the chassis and having a substantially hollow body adapted to allow predetermined personnel access; and a clothing delivery insert module secured about the chassis and having a substantially hollow body adapted to allow predetermined personnel access.

In one embodiment, a multiunit assembly comprises a first delivery reception unit having a first frame chassis; a first insert module secured within the first frame chassis and having a proximate electronic delivery access and a distal electronic receiving access; and a second insert module secured within the first frame chassis, and having a proximate electronic delivery access and a distal electronic receiving access; and a second delivery reception unit having a second frame chassis adjacent the first frame chassis; a first insert module secured within the second frame chassis and having a proximate electronic delivery access and a distal electronic receiving access; and a second insert module secured within the second frame chassis, and having a proximate electronic delivery access and a distal electronic receiving access.

In certain examples, the apparatus may include an overhead support aligned above the first delivery reception unit and the second delivery reception unit. The apparatus may include an illuminated exterior. The apparatus may include a monitored exterior.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 15a is a partially exploded front view of the embodiment introduced in

FIG. 15;

DESCRIPTION OF EMBODIMENTS

Figure 1:
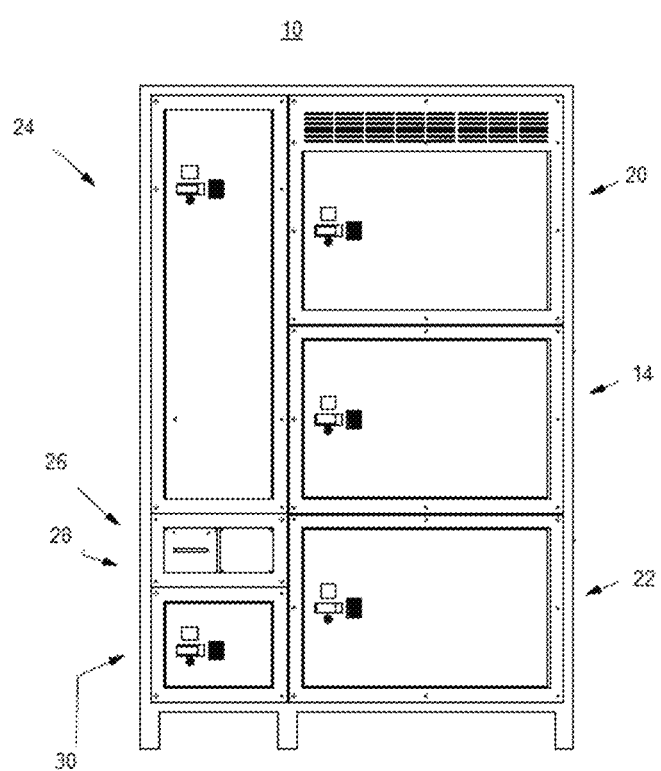
FIG. 1 is a front view of one embodiment of a unit according to the present disclosure.
Figure 2:
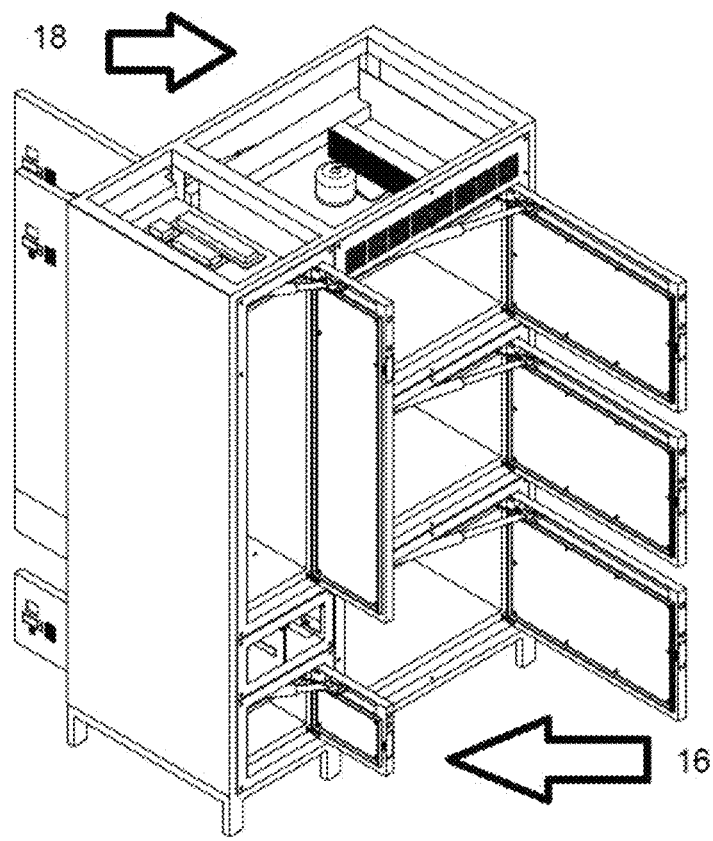
FIG. 2 is a front perspective view of the embodiment introduced in FIG. 1 in a partially open position, with elements removed for clarity.
Figure 3:
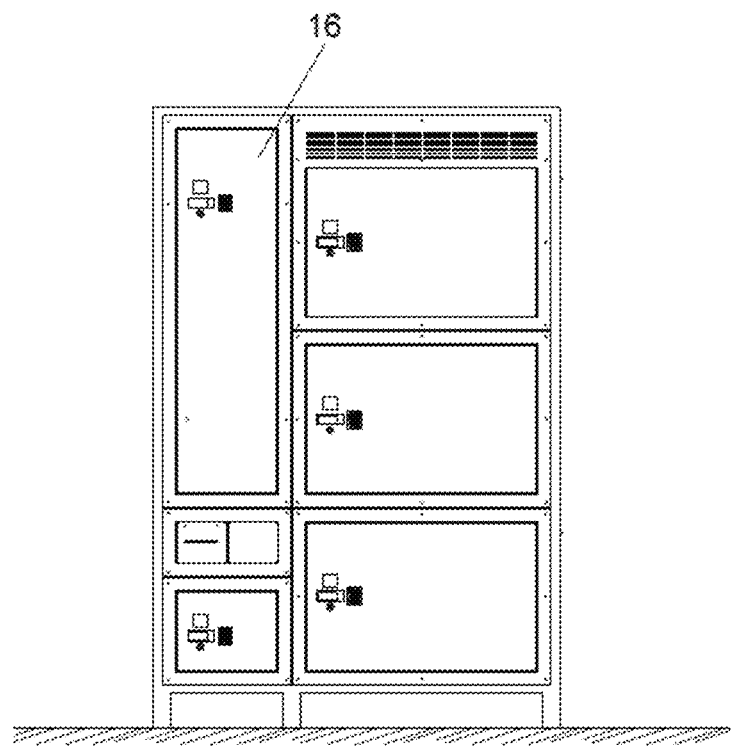
FIG. 3 is a front view of the embodiment introduced in FIG. 1 in a closed position, with elements removed for clarity.
Figure 4:
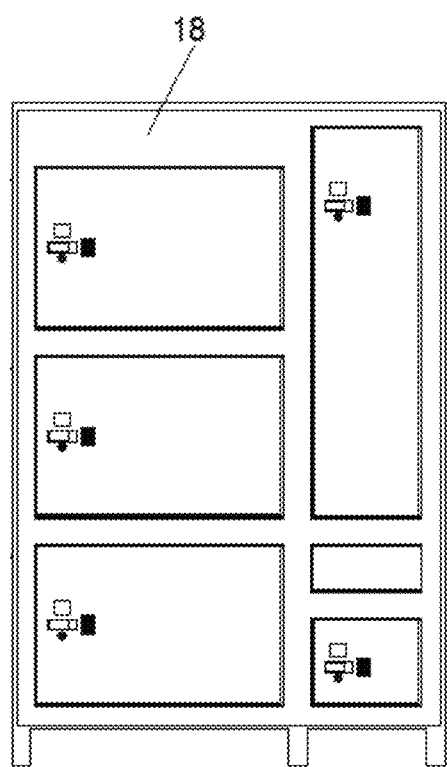
FIG. 4 is a rear view of the embodiment introduced in FIG. 1 in a closed position, with elements removed for clarity.
Figure 5:
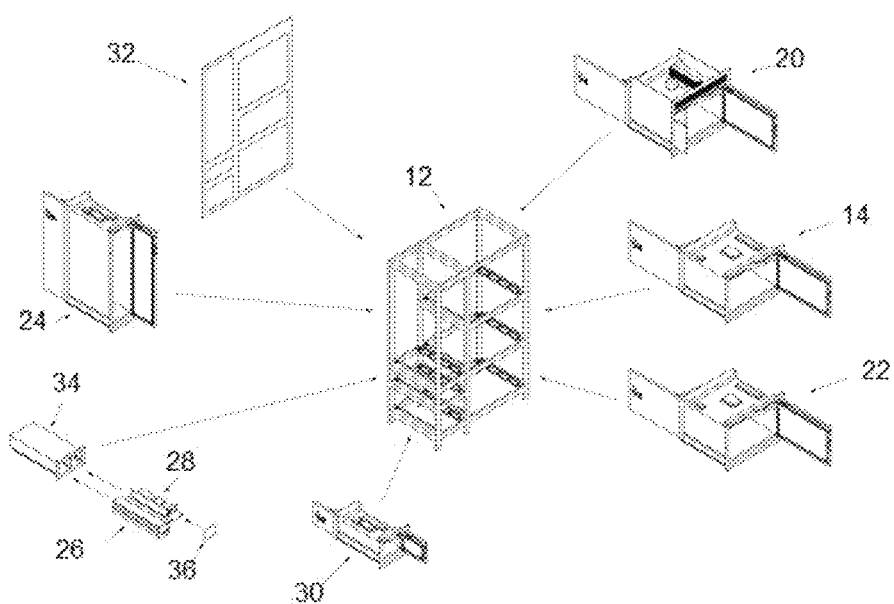
FIG. 5 is a partially exploded front view of the embodiment introduced in FIG. 1.
Figure 6:
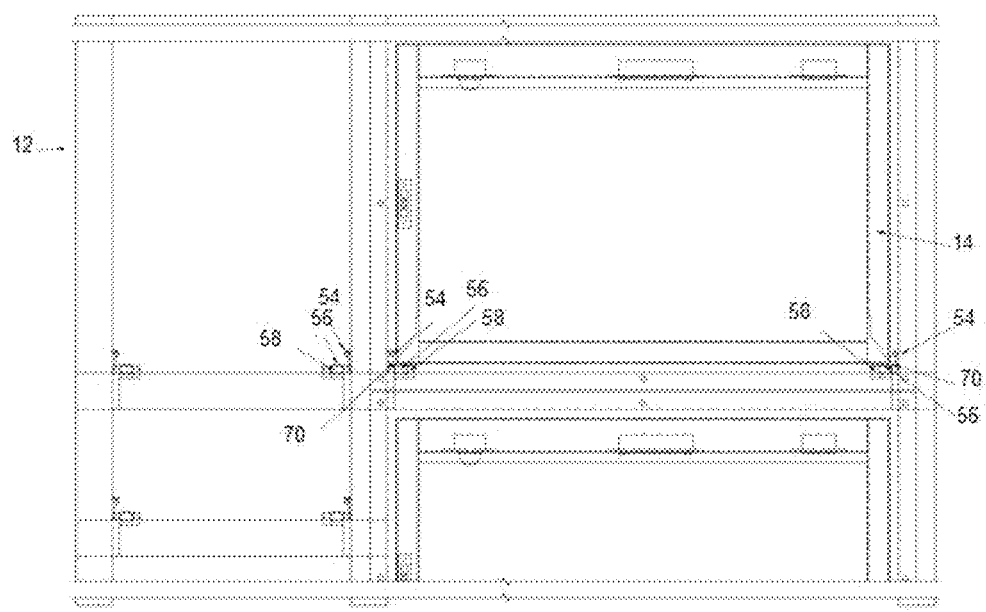
FIG. 6 is a front view of the embodiment introduced in FIG. 1 in a closed position, with elements removed for clarity.
Figure 7:
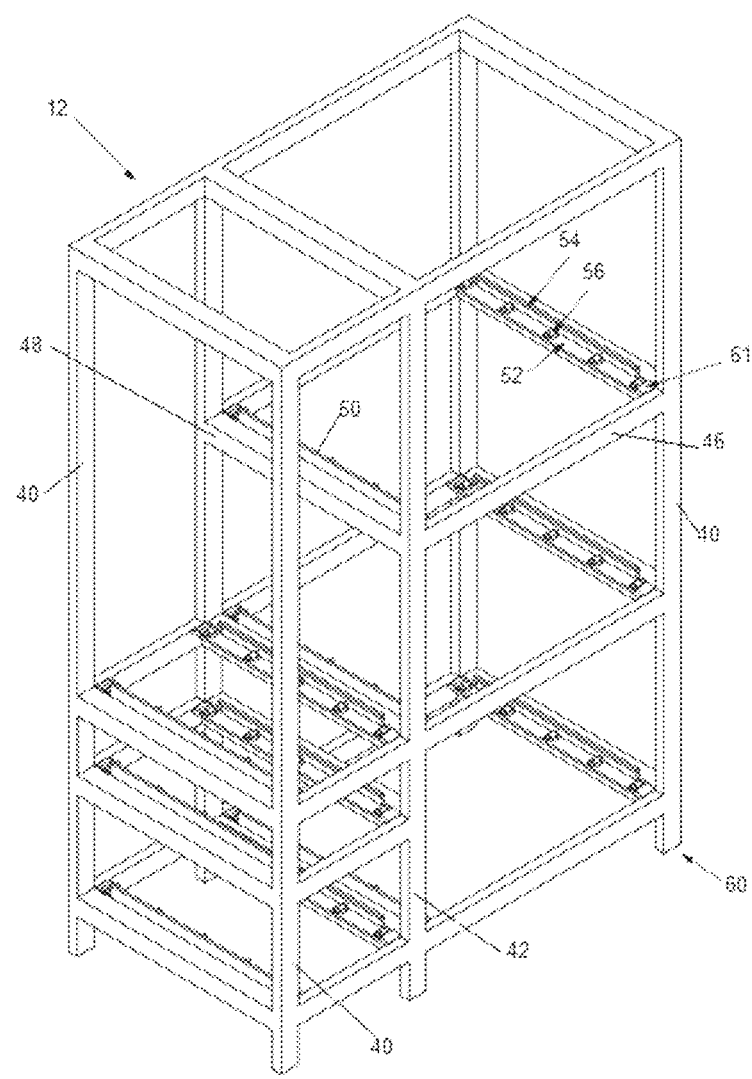
FIG. 7 is a front perspective view of an isolated frame chassis introduced in the embodiment of FIG. 1.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 17:
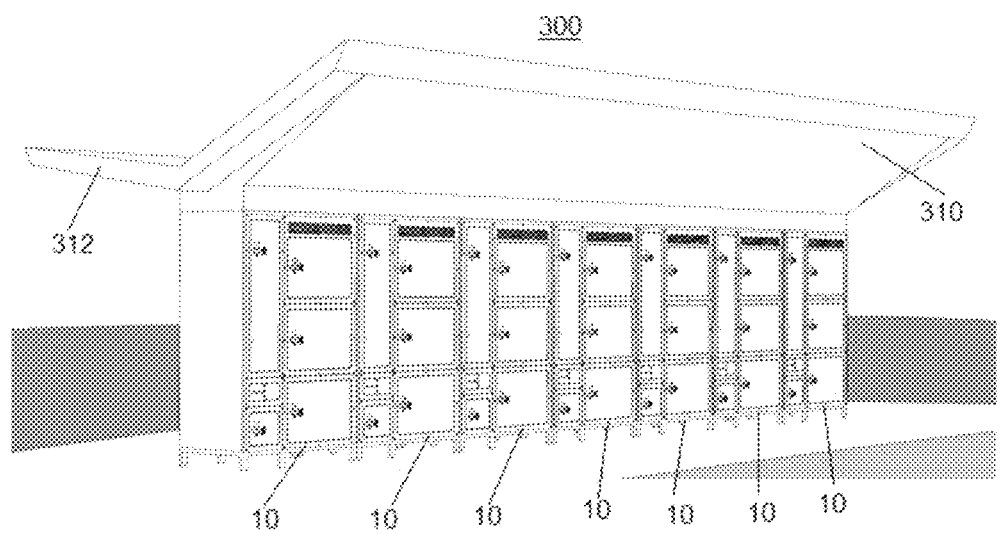
FIG. 17 is a front perspective view of one embodiment of a multiunit assembly according to the present disclosure.

Referring now to the drawings in general and FIG. 1 in particular, it will be understood that the illustrations are for the purpose of describing embodiments of the disclosure and are not intended to limit the disclosure or any inventions thereto. As best seen in FIGS. 1 and 17, universal reception units 10 and multiunit assemblies 300 are shown embodied according to the present disclosure to provide improved, discreet reception of independent deliveries, for instance securing deliveries in a household environment, commercial site, or the like. Those skilled in the art having the benefit of this disclosure will recognize additional tower structure features to support any secure handling of unsupervised delivery reception and temporary storage application at a specific site, whether or not the site is a smart-home/site, to provide the communications capabilities, security and monitoring advantages, contactless features, and structural integrity improvements shown and described herein.

In certain examples, the present inventions are directed to a system and method of a plurality of single providers supplying goods and/or services to a household, commercial site, or group thereof. Typically these goods and services are independently supplied to customers on a periodic basis, over a period of time. In certain embodiments, the methodology includes generating a list of available goods and services and soliciting at least one household within a geographic area. Those skilled in the art having the benefit of this disclosure will recognize orders may be received from the household(s) in a variety of ways, and any of the goods/services may be acquired from a plurality of different suppliers and may include a diverse range including food items, clothing, gifts for house-hold members, etc.

As shown and described herein, on a periodic basis, for instance as indicated by each of the customers, the provider delivers to the unit(s) an unsupervised delivery. Similarly, while at the household, the provider may also perform predetermined services indicated by the customer. This system and method may provide for a single provider to get to know each of the customers and provide them with quality goods and services at a low cost and timely manner. In certain examples, the provider may initially accumulate a list of goods and services that are offered to the customers. The goods may include food items such as milk, meat, bread, cereal, specific meals that are served hot, as well as items requiring age-specific delivery standards, including, but not limited to, alcohol and tobacco materials. Any variety of non-food stuffs may further be included such as clothes, yard supplies, and household items such as shampoo, toothpaste, soap, and the like. In one embodiment, the goods are acquired from a plurality of different stores because they include a diverse array of items that cannot be located within a single store. Additionally, the provider(s) used by the supplier may be chosen because of quality of the goods, price, or availability. Those skilled in the art having the benefit of this disclosure will recognize any provider/supplier combination thereof.

In certain examples, at the time a customer subscribes to the service, personal information about the household may be obtained. The information may include birth dates of house hold members, names and ages of the persons residing at the dwelling, for instance to support any of the required age-specific unsupervised deliveries shown and described herein. Further, this information may allow the provider to learn more about the household and to purchase more personalized goods. Additionally, the information may spur the provider to offer additional goods and services that were not initially included. The provider can accumulate the orders from each of the customers and better determine goods and services that are in demand. The personal information may also be compiled and prepared for the customer to remind them of important dates and events that will affect them. By way of example, the provider may notify the customer that his or her spouse's birthday is coming up within a week and birthday gifts, cake, and other appropriate items should be purchased in preparation for this event.

Any of the delivery reception units 10 shown and described herein may be installed at the customer's dwelling, commercial site, or the like. As illustrated, the delivery reception units 10 and assemblies 300 are segmented, independent compartmentalized storage devices to house the goods that are delivered to the customer. The delivery reception units 10 allow the customer to receive and store numerous goods in an attractive, secure, unsupervised, and functional device without the provider entering the household, and in particular examples in a contactless environment. The customer then does not worry about persons being in their home, introducing foreign contaminants, including but not limited to infectious diseases and the like, and it is not necessary for the customer to be at home at the time the goods are delivered. The delivery reception units 10 provide an attractive, free standing storage facility that is positioned adjacent a pick-up site, for instance on the household property, commercial site, multi-family site, the like, and a combination thereof. The delivery reception unit 10 may have a variety of exteriors to match and blend with the existing house, may be separated from a dwelling or multiunit environment, may be affixed to or otherwise incorporated into the dwelling, or the like, as shown and described herein.

As shown in FIGS. 1-5, one embodiment of the a universal delivery reception unit 10 includes a stand-alone chassis frame 12 that is generally positioned proximate to a building. A plurality of insert modules are secured about the chassis 12, and include an electronic delivery door on a first side 16 (i.e. proximate access face) of the chassis 12 and an electronic receiving door on a second side 18 (i.e. distal access face) of the chassis 12, wherein the delivery door and the receiving door are independent and define a substantially hollow body for temporarily receiving and storing items delivered to the building. In certain examples, the insert module may be a dry goods module 14, 22, a clothing delivery module 24, a small package module 30, a cold storage module 20, an incubated module, an electronics housing 26, 28, the like, a combination thereof, and those skilled in the art having the benefit of this disclosure will recognize additional insert module arrangements. As further illustrated, the unit 10 may include a trim panel 32 substantially enclosing surfaces adjacent the insert modules.

As illustrated in FIGS. 6-9, the universal delivery reception unit 10 may have a frame chassis 12 with a first, second, third and fourth sides, wherein the first and second sides may oppose one another and the third and fourth sides may oppose one another to provide any of the structural integrity shown and described herein. The frame chassis 12 may include a plurality of spatially separated vertical frame supports 40. The frame 12 may include at least one intermediate vertical frame support 42. The frame 12 may include a plurality of lateral supports 46. The frame 12 may include a plurality of cross supports. The cross supports may include a first rail 50 and an opposing, coplanar second rail 52. The first rail 50 and the second rail 52 may include a guide rail retention flange 54. The first rail 50 and the second rail 52 may include at least one roller wheel 56. The first rail 50 and the second rail 52 may include a ramp 58 to assist self-seating any of the insert modules shown and described herein. Further, the first rail 50 and the second rail 52 may include a guideway 61 to lock an edge of the insert module in a fixed position. In certain examples, the frame 12 may include a foundation assembly. The foundation assembly may include a plurality of footings 60. In certain examples, the plurality of footings 60 may be independently adjustable to mate with a corresponding surface.

Figure 8:
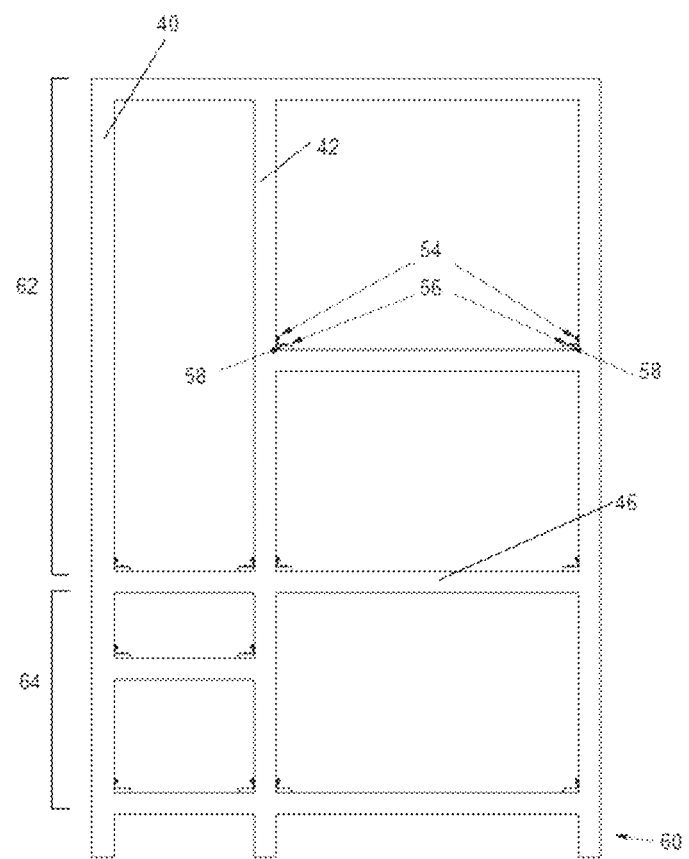
FIG. 8 is a front view of the embodiment in FIG. 7, with elements removed for clarity.
Figure 8A:
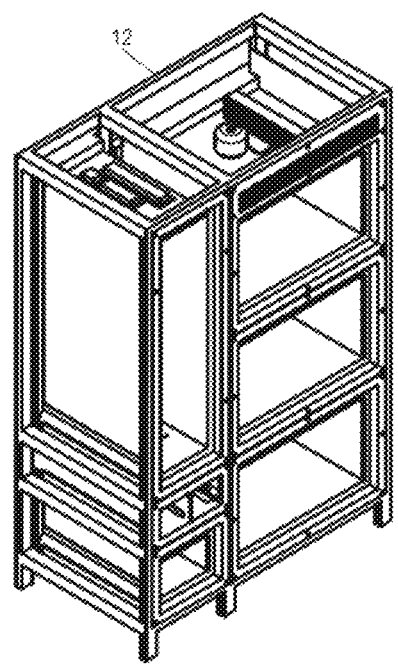
FIG. 8a is a front perspective view of the embodiment in FIG. 7, with elements removed for clarity.
Figure 8B:
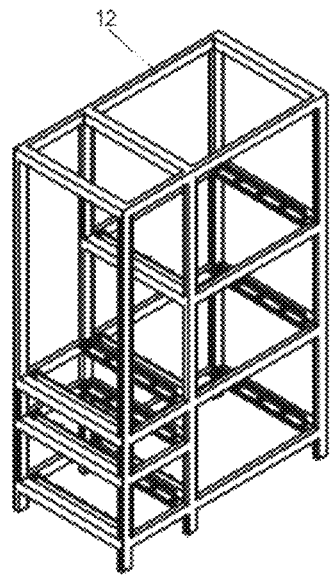
FIG. 8b is a front perspective view of the embodiment in FIG. 7, with elements removed for clarity.
Figure 8C:
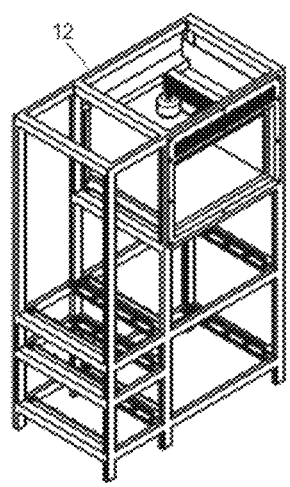
FIG. 8c is a front perspective view of the embodiment in FIG. 7, with elements removed for clarity.
Figure 9:
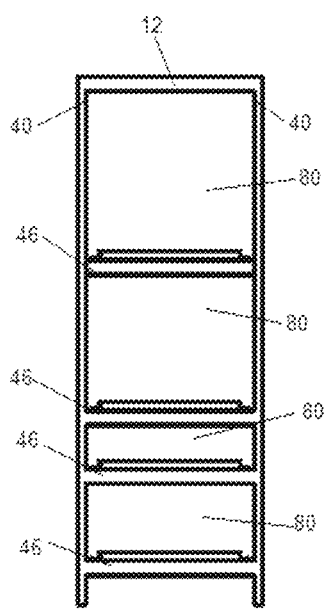
FIG. 9 is a side view of the embodiment in FIG. 7, with elements removed for clarity.

As shown in FIG. 8, one embodiment of a universal assembly for delivery reception 10 includes an upper tier 62 having a pair of spatially separated horizontal rails to secure at least one horizontal interconnect module pulled-through the upper tier 62 in a mated position. Similarly, the delivery reception 10 includes a lower tier 64 having a pair of spatially separated horizontal rails to secure at least one horizontal interconnect module pulled-through the lower tier 64 in a mated position.

A variety of insert modules may be secured within the frame 12 to support any of the unsupervised delivery receptions shown and described herein. As shown in FIGS. 10-14*a*, the insert module is generally secured, for instance via the one-way secured seating, within the frame 12 and has a proximate electronic delivery access face and an independent, opposing distal electronic receiving access face. As illustrated, the proximate electronic access faces may include a scan pad 104 to electronically communicate with an external signal, including but not limited to any of the wireless and wired electronic communications herein. The proximate electronic access faces may include an electronic piston shock 76, or the like.

As illustrated, the apparatus may include a shocking mounting pivot bracket 78 to support the electronic piston shock 76. The apparatus may include a door cavity 90 to receive the electronic piston shock 76 in a closed position. The proximate electronic delivery access faces may include at least one hinge 102, 102'. The proximate electronic delivery access faces may include a handle 106. The proximate electronic access faces may include a manual backup.

The manual backup may include a number pad 112 and a keyed switch 108, for instance to enable/disable full manual and full electronic operation. The proximate electronic access faces may include a momentary switch. The momentary switch may include a push button 92 to activate electronic piston shock 76. The proximate electronic access faces may include a sensor. The sensor may include a door-ajar sensor 94 to notify, including remote notification, of an open door status.

Figure 10:
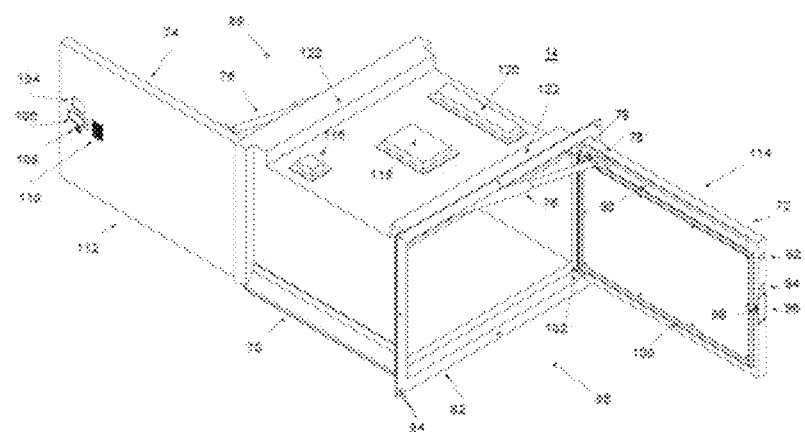
FIG. 10 is a top perspective view of an isolated insert module introduced in the embodiment of FIG. 1 in a partially open position, with elements removed for clarity.
Figure 10A:
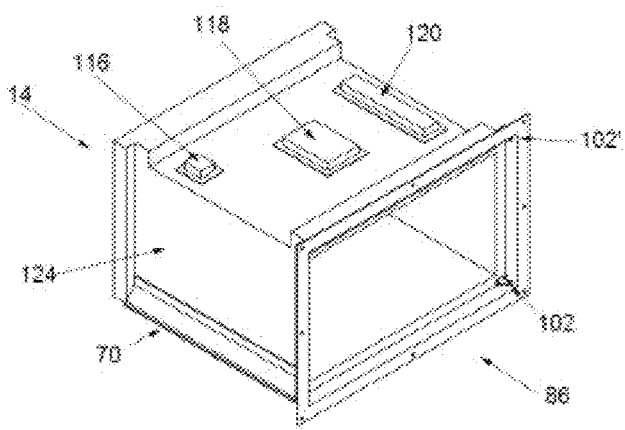
FIG. 10a is a top perspective view of the embodiment in FIG. 10, with elements removed for clarity.
Figure 10B:
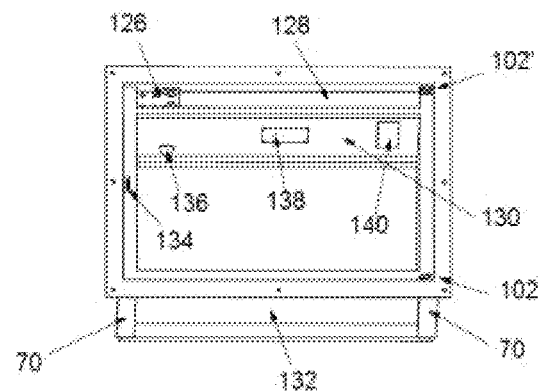
FIG. 10b is a front view of the embodiment in FIG. 10, with elements removed for clarity.
Figure 10C:
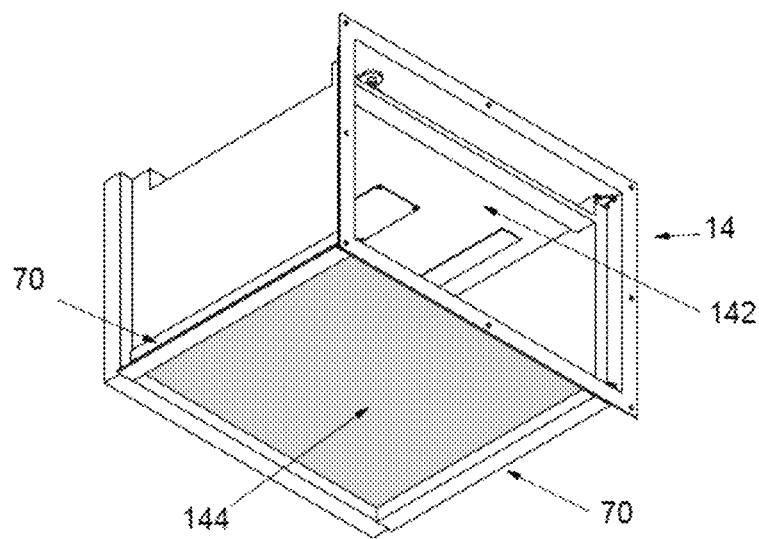
FIG. 10c is a top perspective view of the embodiment in FIG. 10, with elements removed for clarity.
Figure 10D:
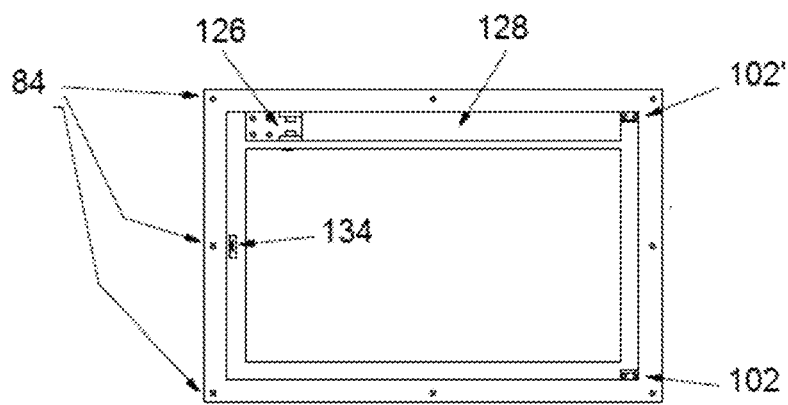
FIG. 10d is a front view of the embodiment in FIG. 10, with elements removed for clarity.
Figure 11:
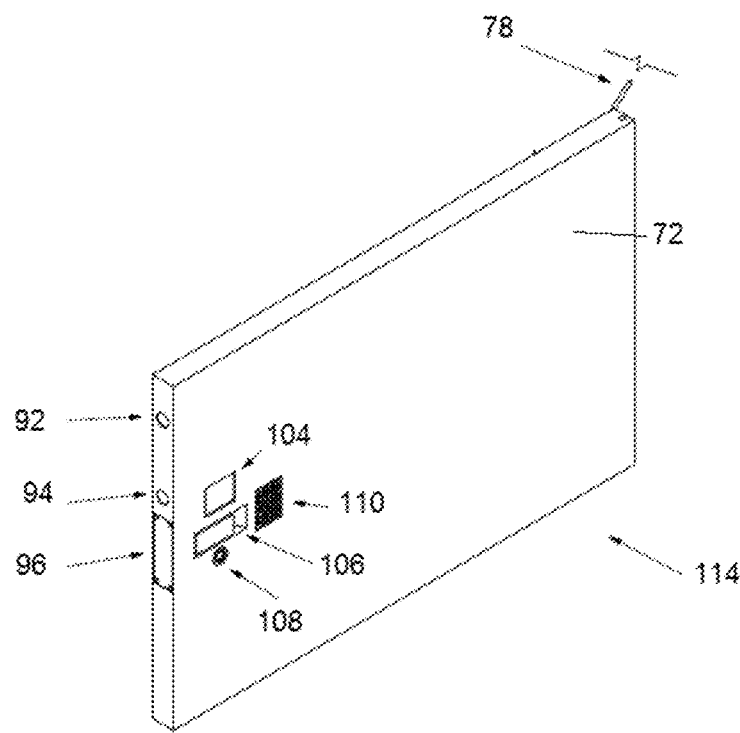
FIG. 11 is a front perspective view of an isolated door introduced in the embodiment in FIG. 10, with elements removed for clarity.
Figure 12:
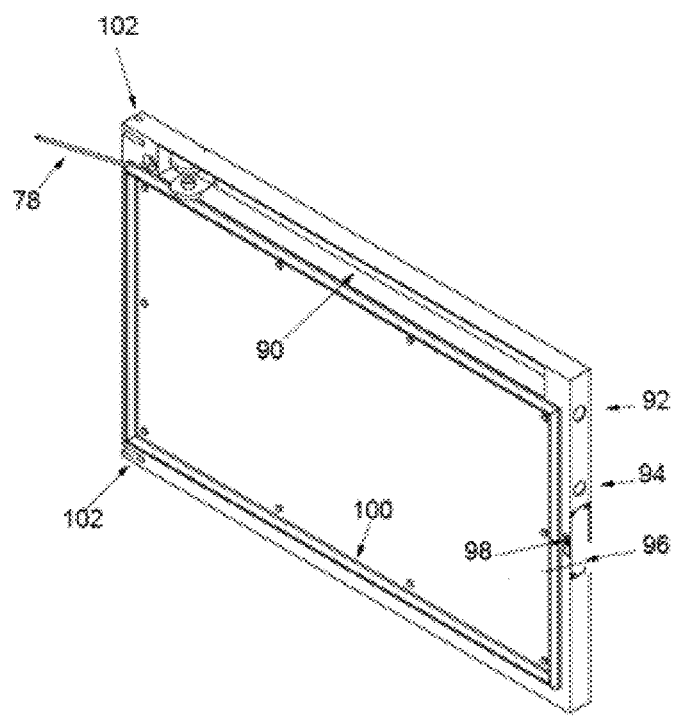
FIG. 12 is a rear perspective view of an isolated door introduced in the embodiment in FIG. 10, with elements removed for clarity.
Figure 13:
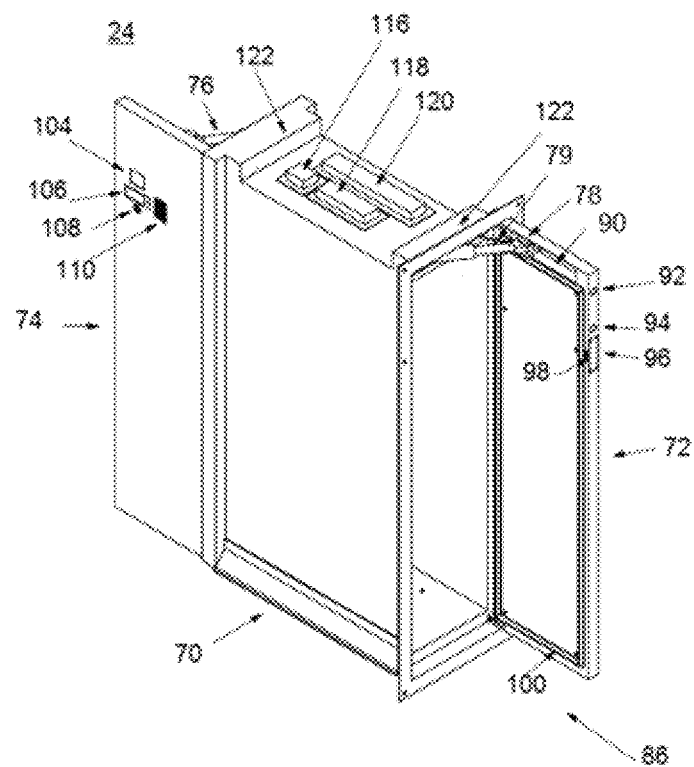
FIG. 13 is a top perspective view of an isolated insert module introduced in the embodiment of FIG. 1 in a partially open position, with elements removed for clarity.
Figure 13B:
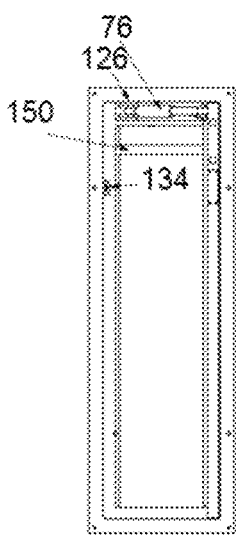
FIG. 13b is a front view of the embodiment in FIG. 13, with elements removed for clarity.
Figure 13C:
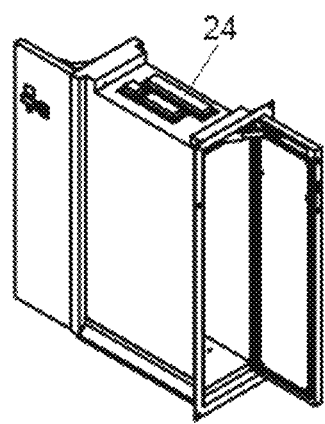
FIG. 13c is a top perspective view of the embodiment in FIG. 13, with elements removed for clarity.

As introduced in FIG. 10, the door may include a cover, for instance a removable access cover 96, to expose any of the interior elements shown and described herein. The door may further include a door latch, for instance an electronic door latch 98, mechanical, pneumatic or the like to mate with corresponding elements. A variety of mounting brackets may support the various components and connections herein. As shown in FIG. 10b, the apparatus may include a shock pivot mount 126 or the like.

Similarly, the distal electronic access faces may include a scan pad 104 to electronically communicate with an external signal, including but not limited to any of the wireless and wired electronic communications herein. The distal electronic access faces may include an electronic piston shock 76, or the like. As illustrated, the apparatus may include a shocking mounting pivot bracket 78 to support the electronic piston shock 76. The apparatus may include a door cavity 90 to receive the electronic piston shock 76 in a closed position. The distal electronic access faces may include at least one hinge 102, 102'. The distal electronic access faces may include a handle 106. The distal electronic access faces may include a manual backup. The manual backup may include a number pad 112 and a keyed switch 108, for instance to enable/disable full manual and full electronic operation. The distal electronic access faces may include a momentary switch. The momentary switch may include a push button 92 to activate electronic piston shock 76. The distal electronic access faces may include a sensor. The sensor may include a door-ajar sensor 94 to notify, including remote notification, of an open door status.

As shown, the interconnect modules generally include a secure, i.e. locked or the like, interior space. The interior space may include a pair of opposing doors 72, 74 in communication with the electronic piston shocks 76. The interior space may include an imaging device to display to a user, for instance camera 136. The interior space may include illumination, for instance an interior dome light 138. The interior space may include a sanitizer. The sanitizer may include an ultraviolet sanitizing light 140. And as shown in FIG. 10a, the interconnect module may include a camera housing 116 to support interior camera 136. The interconnect module may include a dome light housing 118 to support interior dome light 138. The interconnect module may include a sanitizer housing 120 to support an interior sanitizer 140.

Figure 16:
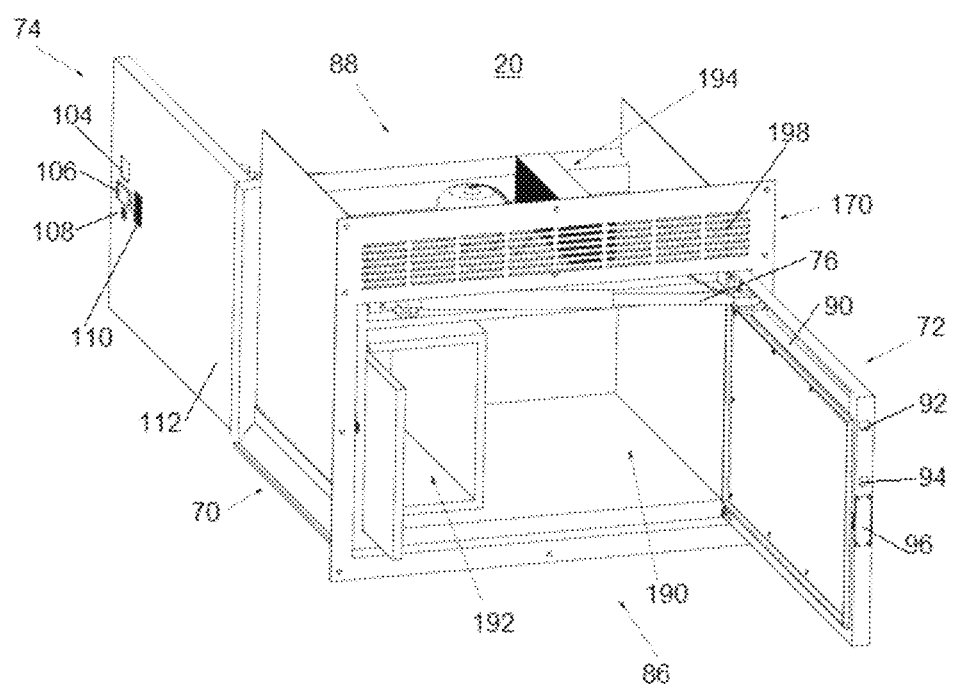
FIG. 16 is a top perspective view of an isolated insert module introduced in the embodiment of FIG. 1 in a partially open position, with elements removed for clarity.

Examples of the interconnect modules may include a pair of offset upper edges or the like. As introduced in FIG. 13, offset upper edges 122 may be recessed from an upper surface. Further, the interconnect modules may include a railway foot 70 along at least one bottom length to engage a corresponding frame element as shown and described herein. The interconnect modules may include a recessed side surface. The interconnect modules may include a mounting plate 170 to mate with corresponding frame chassis, panel, and adjacent modules herein. The mounting plate 170 may include a plurality of fastener apertures 84. The interconnect modules may include a door outside skin 112,114 to provide any of the structural and aesthetic features herein. As further illustrated in FIG. 16, certain interconnect module embodiments include a plurality of cold storage refrigerant components 194, ventilation elements 198 on mounting portion 170, and the like. For example, the cold storage interconnect modules may include a freezer section 192, refrigerated section 190, the like, and a combination thereof. Those skilled in the art having the benefit of this disclosure will recognize a variety of cold storage interconnect module designs and arrangements.

Figure 14:
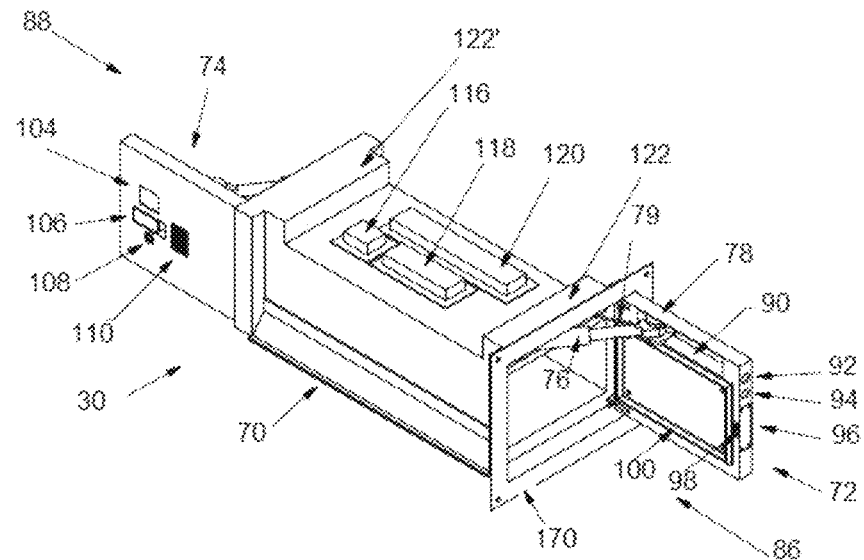
FIG. 14 is a top perspective view of an isolated insert module introduced in the embodiment of FIG. 1 in a partially open position, with elements removed for clarity.
Figure 14A:
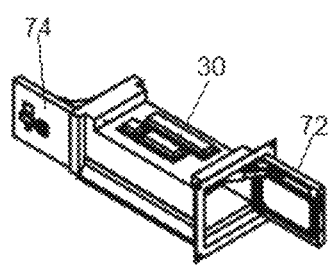
FIG. 14a is a top perspective view of the embodiment in FIG. 14, with elements removed for clarity.
Figure 15:
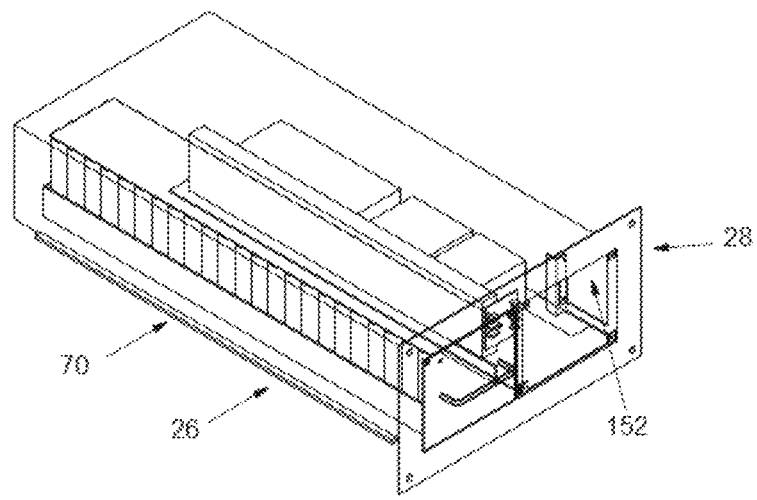
FIG. 15 is a top perspective view of an isolated electrical module introduced in the embodiment of FIG. 1, with elements removed for clarity.
Figure 15A:
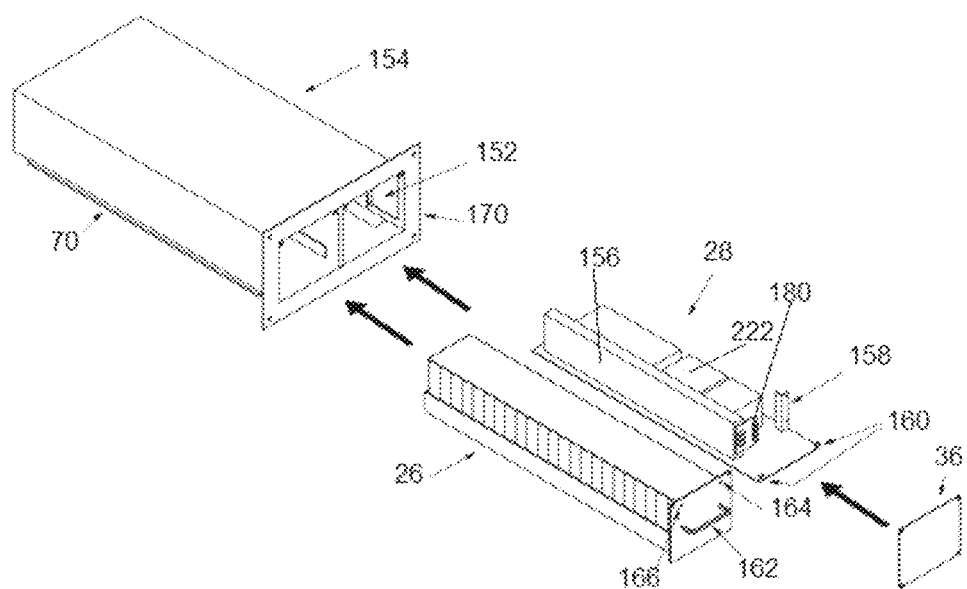
Figure 15B:
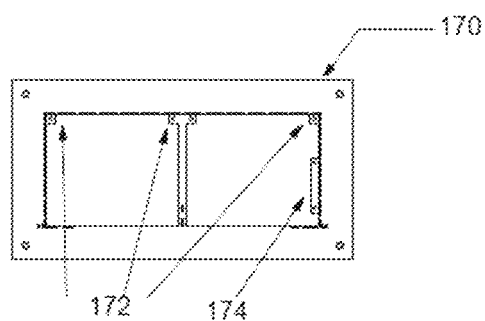
FIG. 15b is a front view of the embodiment introduced in FIG. 15, with elements removed for clarity.
Figure 15C:
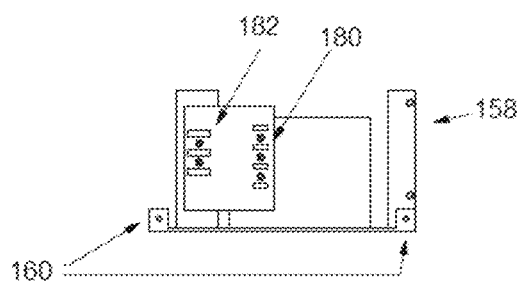
FIG. 15c is a side view of the embodiment introduced in FIG. 15, with elements removed for clarity.

As shown in FIGS. 14-15c, the electronics housing box may include a battery module 26 to support any of the battery and/or battery back-up shown and described herein. The electronics housing box may include a positive power indicator 164 and a negative power indicator 166. The battery module 26 may include a standby battery power module terminal strip 182. Similarly, the electronics housing box may include a central processing unit (CPU) module 28 aligned within cavity 152 and in electronical communication with the interconnect modules. The assembly may include a housing tab 174 to mate with a corresponding CPU module tab 158 in an aligned position. The assembly may include a terminal strip 180 to provide any of the electronic connections shown and described herein. The electronics housing box may include a cover plate 36, and for instance aligned about a cover plate securement tab 160 in an aligned position. The electronics housing box may include fastener points 172. Battery components and elements herein may be removeable, exchangeable, and the like. For instance battery module 26 may be removable via a pull handle 162 or the like. Those skilled in the art having the benefit of this disclosure will recognize a variety of power, battery, and similar electrical and data communication assemblies and arrangements.

FIG. 17 illustrates one embodiment of a multiunit assembly 300 having a plurality of adjacent delivery reception units 10. The multiunit assembly 300 may include an overhead support 310, 312 aligned above the adjacent delivery reception units 10. Further, the multiunit assembly 300 may include an illuminated exterior, monitored exterior, cladding, and the like.

In one embodiment, a delivery reception unit 10 includes a chassis 12 defining a plurality of openings 80; and a plurality of separable, individually automated insert modules housed within the openings 80. The insert modules typically have a delivery access and a receiving access that is independent of the delivery access, for instance to provide any of the hygiene and sanitation support shown and described herein, and generally provide temporarily storage for items delivered to the unit 10.

In one embodiment, a universal delivery reception unit 10 includes a chassis 12 having a vertical support rails 40, an intermediate vertical support rail 42, and a lateral support rail 46; a dry box insert module 14, 22 secured about chassis 12 and having a substantially hollow body to allow predetermined personnel access; a cold storage insert module 20 secured about chassis 12 and having a substantially hollow body to allow predetermined personnel access; and a clothing delivery insert module 24 secured about chassis 12 and having a substantially hollow body to allow predetermined personnel access.

In one embodiment, a multiunit assembly 300 comprises a first delivery reception unit 10 having a first frame chassis 12; a first insert module secured within the first frame chassis 12 and having a proximate electronic delivery access and a distal electronic receiving access; and a second insert module secured within the first frame chassis 12, and having a proximate electronic delivery access and a distal electronic receiving access; and a second delivery reception unit 10 having a second frame chassis 12 adjacent the first frame chassis 12; a first insert module secured within the second frame chassis 12 and having a proximate electronic delivery access and a distal electronic receiving access; and a second insert module secured within the second frame chassis 12, and having a proximate electronic delivery access and a distal electronic receiving access.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A universal delivery reception unit comprising:
   a. a stand-alone chassis frame positioned proximate to a building; and
   b. a plurality of insert modules secured about said chassis frame, and having a proximate electronic delivery access face with an electronic delivery door on a first side of said chassis frame and comprising an electronic piston shock assembly, and an opposing distal electronic receiving access face with an electronic receiving door on a second side of said chassis frame, and wherein said delivery door and said receiving door are independent and define a substantially hollow body adapted for temporarily storing items delivered to said building, and
      wherein said universal delivery reception unit being positioned substantially adjacent to said building.

2. The system of claim 1, wherein said insert module includes a security lock assembly.

3. The system of claim 1, wherein said insert module includes an illumination assembly.

4. The system of claim 1, wherein said insert module includes a monitoring assembly.

5. The system of claim 1, wherein said insert module includes a sanitation assembly.

6. The system of claim 1, wherein said delivery door of a first insert module includes a first electronic communication, and a second insert module includes a second electronic communication distinct of said first electronic communication.

7. A universal delivery reception unit comprising:
   a. a frame having a first, second, third and fourth sides, said first and second sides opposing one another and said third and fourth sides opposing one another;
   b. a first insert module secured within said frame and having a proximate electronic delivery access face and an independent, opposing distal electronic receiving access face;
   c. at least a second insert module adjacent said first insert module and secured within said frame, and wherein said second insert module having a proximate electronic delivery access face and an independent, opposing distal electronic receiving access face;
   d. a front trim panel substantially enclosing surfaces adjacent said insert modules; and
   e. a rear trim panel substantially enclosing surfaces adjacent said insert modules, and
      wherein said universal delivery reception unit being a stand-alone unit positioned proximate to a household for temporarily storing items delivered to said household.

8. The apparatus of claim 7, wherein said frame includes at least one of:
   a. a plurality of spatially separated vertical frame supports,
   b. at least one intermediate vertical frame support, and
   c. a plurality of cross supports.

9. The apparatus of claim 8, wherein said cross supports include a first rail and an opposing, coplanar second rail.

10. The apparatus of claim 9, wherein said first rail and said second rail comprise a guide rail retention flange.

11. The apparatus of claim 9, wherein said first rail and said second rail comprise at least one roller wheel.

12. The apparatus of claim 9, wherein said first rail and said second rail comprise a ramp adapted for self-seating said insert modules.

13. The apparatus of claim 9, wherein said first rail and said second rail comprise a guideway adapted to lock an edge of said insert module in a fixed position.

14. The apparatus of claim 7, wherein said insert module is at least one chosen from the group consisting of:
   a. a dry cleaning box,
   b. a small package box,
   c. at least a partial cold storge box,
   d. at least a partially incubated box,
   e. a dry goods box, and
   f. an electronics housing box.

15. The apparatus of claim 7, wherein at least one of said proximate electronic delivery access faces include a scan pad adapted to electronically communicate with an external signal.

16. The apparatus of claim 7, wherein at least one of said proximate electronic delivery access faces include an electronic piston shock assembly.

17. The apparatus of claim 7, wherein said at least one of said proximate electronic delivery access faces includes at least one hinge.

18. The apparatus of claim 7, wherein at least one of said proximate electronic delivery access faces include a manual backup.

19. The apparatus of claim 7, wherein at least one of said proximate electronic delivery access faces include a momentary switch.

20. The apparatus of claim 19, wherein said momentary switch includes a push button adapted to activate an electronic piston shock.

21. The apparatus of claim 7, wherein at least one of said proximate electronic delivery access faces include a sensor.

22. The apparatus of claim 21, wherein said sensor comprises a door-ajar sensor adapted to notify an open door status.

23. The apparatus of claim 7, wherein at least one of said distal electronic access faces include a scan pad adapted to electronically communicate with an external signal.

24. The apparatus of claim 7, wherein an electronics housing box includes a positive power indicator and a negative power indicator.

25. The apparatus of claim 24, wherein said electronics housing box includes a central processing unit (CPU) module in electronic communication with said insert modules.

26. The apparatus of claim 7, wherein a battery module includes a standby battery power module terminal strip.

27. The apparatus of claim 7, including at least one cold storage refrigerant component.

28. The apparatus of claim 27, including at least one freezer section.

29. The apparatus of claim 27, including at least one refrigerated section.

30. A universal assembly for delivery reception, said assembly comprising:
   a. an upper tier having a pair of spatially separated horizontal rails and at least one horizontal interconnect module pulled-through said upper tier in a mated position and secured on said horizontal rails, wherein said horizontal interconnect module comprising a pair of opposing electronic piston shocks; and
   b. a lower tier adjacent to said upper tier and having a pair of spatially separated horizontal rails and at least one horizontal interconnect module pulled-through said lower tier in a mated position and secured on said horizontal rails, wherein said horizontal interconnect module comprising a pair of opposing electronic piston shocks.

31. The assembly of claim 30, wherein said interconnect modules comprising a secure interior space.

32. The assembly of claim 31, wherein said interior space comprising a pair of opposing doors in communication with said electronic piston shocks.

33. The assembly of claim 31, wherein said interior space includes a camera.

34. The assembly of claim 31, wherein said interior space includes an interior dome light.

35. The assembly of claim 31, wherein said interior space includes a sanitizer.

36. The assembly of claim 30, wherein said interconnect modules include a pair of offset upper edges being recessed from an upper surface.

37. The assembly of claim 30, wherein said interconnect modules include a railway foot aligned along at least one bottom length adapted to engage a corresponding frame element.

38. The assembly of claim 37, wherein said interconnect modules include a recessed side surface.

39. The assembly of claim 30, wherein said assembly being a stand-alone unit positioned proximate to a building for temporarily storing items delivered to said household.

40. The assembly of claim 30, including a foundation assembly adapted to secure said assembly about a surface.

* * * * *